(12) United States Patent
Kuga et al.

(10) Patent No.: US 11,988,219 B2
(45) Date of Patent: May 21, 2024

(54) SEALING DEVICE AND INTEGRATED PUMP

(71) Applicant: IHI Corporation, Koto-ku (JP)

(72) Inventors: Toru Kuga, Tokyo (JP); Yasuhiro Ishikawa, Tokyo (JP)

(73) Assignee: IHI Corporation, Koto-ku (JP)

(*) Notice: Subject to any disclaimer, the term of this patent is extended or adjusted under 35 U.S.C. 154(b) by 289 days.

(21) Appl. No.: 17/433,488

(22) PCT Filed: Aug. 2, 2019

(86) PCT No.: PCT/JP2019/030514
§ 371 (c)(1),
(2) Date: Aug. 24, 2021

(87) PCT Pub. No.: WO2020/174718
PCT Pub. Date: Sep. 3, 2020

(65) Prior Publication Data
US 2022/0136517 A1    May 5, 2022

(30) Foreign Application Priority Data
Feb. 25, 2019  (JP) .................................. 2019-031403

(51) Int. Cl.
*F04D 29/10*    (2006.01)
*F02K 9/46*    (2006.01)
(Continued)

(52) U.S. Cl.
CPC .............. *F04D 29/104* (2013.01); *F02K 9/46* (2013.01); *F04D 13/14* (2013.01); *F04D 29/108* (2013.01);
(Continued)

(58) Field of Classification Search
CPC ...... F04D 29/104; F04D 13/14; F04D 29/108; F04D 29/128; F04D 13/043;
(Continued)

(56) References Cited

U.S. PATENT DOCUMENTS 3,377,073 A * 4/1968 Harney ................. F16J 15/441
277/927
4,193,603 A * 3/1980 Sood ........................ F16J 15/40
277/303

(Continued)

FOREIGN PATENT DOCUMENTS

JP    4-113081 A    4/1992
JP    2002-13645 A    1/2002
(Continued)

OTHER PUBLICATIONS

Japanese Third Party Notification DATed Jun. 21, 2022 in Japanese Patent Application No. 2021-501530 (with partial unedited computer generated English Translation), 4 pages.
(Continued)

*Primary Examiner* — Charles G Freay
*Assistant Examiner* — David N Brandt
(74) *Attorney, Agent, or Firm* — Oblon, McClelland, Maier & Neustadt, L.L.P.

(57) ABSTRACT

A sealing device includes a plurality of non-contact seals provided along a sealed shaft; a contact seal provided on at least one of two sides of the plurality of non-contact seals; an injection part that supplies purge gas into a first space of spaces arranged in an axial direction of the sealed shaft, the spaces being between the plurality of non-contact seals and the contact seal; and a collector that collects the purge gas from a second space of the spaces between the plurality of
(Continued)

non-contact seals and the contact seal, the second space being positioned to be next to the first space in the axial direction.

5 Claims, 2 Drawing Sheets

(51) Int. Cl.
| | |
|---|---|
| *F04D 13/04* | (2006.01) |
| *F04D 13/14* | (2006.01) |
| *F04D 29/12* | (2006.01) |
| *F16J 15/00* | (2006.01) |
| *F16J 15/3204* | (2016.01) |
| *F16J 15/40* | (2006.01) |
| *F16J 15/44* | (2006.01) |
| *F16J 15/447* | (2006.01) |

(52) U.S. Cl.
CPC .......... *F04D 29/128* (2013.01); *F16J 15/002* (2013.01); *F16J 15/3204* (2013.01); *F16J 15/40* (2013.01); *F16J 15/441* (2013.01); *F16J 15/4472* (2013.01); *F04D 13/043* (2013.01)

(58) Field of Classification Search
CPC .... F04D 29/007; F04D 29/086; F04D 29/106; F02K 9/46; F16J 15/002; F16J 15/3204; F16J 15/40; F16J 15/441; F16J 15/4472; F16J 15/447
See application file for complete search history.

(56) References Cited

U.S. PATENT DOCUMENTS

| | | | |
|---|---|---|---|
| 4,477,223 A * | 10/1984 | Giroux | F16J 15/344 |
| | | | 415/110 |
| 7,544,039 B1 * | 6/2009 | Pelfrey | F01D 25/32 |
| | | | 415/230 |
| 7,828,511 B1 * | 11/2010 | Pinera | F04D 13/043 |
| | | | 416/198 A |
| 8,864,441 B1 | 10/2014 | Pinera | |
| 2005/0098957 A1 | 5/2005 | Goss et al. | |
| 2007/0147988 A1 | 6/2007 | Ito et al. | |
| 2013/0106062 A1 | 5/2013 | Hori et al. | |
| 2013/0227931 A1 * | 9/2013 | Danguy | F04D 13/04 |
| | | | 415/171.1 |
| 2016/0177963 A1 | 6/2016 | Danguy et al. | |
| 2017/0343257 A1 | 11/2017 | Watanabe et al. | |
| 2019/0153955 A1 * | 5/2019 | Orr | F02C 7/222 |

FOREIGN PATENT DOCUMENTS

| | | |
|---|---|---|
| JP | 2007-177887 A | 7/2007 |
| JP | 2013-539518 A | 10/2013 |
| JP | 2016-525646 A | 8/2016 |

OTHER PUBLICATIONS

Nosaka, "Bearing of Turbo Pump for Rocket and Axis Seal", Tarbo Machine, vol. 15, No. 6, 1987, 18 total pages (with unedited computer generated English Translation).

* cited by examiner

SEALING DEVICE AND INTEGRATED PUMP

TECHNICAL FIELD

The present disclosure relates to a sealing device and an integrated pump.

The present application is a National Stage entry of PCT/JP2019/030514 filed on Aug. 2, 2019, which claims priority to Japanese Patent Application No. 2019-031403, filed Feb. 25, 2019, the content of which is incorporated herein by reference.

BACKGROUND

Patent Document 1 below discloses a sealing device in which four non-contact seals are disposed at predetermined intervals along a shaft, the sealing device supplies helium gas into a central space of spaces between the four non-contact seals from a purge flow path provided on the outer periphery (outside in the radial direction) and collects the helium gas from discharge flow paths provided in spaces on two sides of the central space in a direction along the shaft. Such a sealing device has two functions, i.e., a mechanical sealing function obtained by the four non-contact seals and a gaseous sealing function based on helium gas.

DOCUMENT OF RELATED ART

Patent Document

[Patent Document 1] U.S. Pat. No. 7,544,039

SUMMARY

Technical Problem

In the technology of Patent Document 1, when the supply of helium gas is stopped, the gaseous sealing function is lost and only the mechanical sealing function is maintained, so that a predetermined sealing performance may not be obtained. That is, there is room in the related art for improvement in reliability of sealing performance.

The present disclosure is made in view of the above circumstances, and an object thereof is to provide a sealing device and a pump having higher reliability than that of the related art.

Solution to Problem

In order to obtain the above object, a sealing device of a first aspect of the present disclosure includes: a plurality of non-contact seals provided along a sealed shaft; a contact seal provided on at least one of two sides of the plurality of non-contact seals; an injection part that supplies purge gas into a first space of spaces arranged in an axial direction of the sealed shaft, the spaces being between the plurality of non-contact seals and the contact seal; and a collector that collects the purge gas from a second space of the spaces between the plurality of non-contact seals and the contact seal, the second space being positioned to be next to the first space in the axial direction.

A second aspect of the present disclosure is that in the sealing device of the first aspect, the collector is configured to collect the purge gas from the second space positioned on each of two sides of the first space.

A third aspect of the present disclosure is that in the sealing device of the first or second aspect, the sealed shaft is a rotary shaft of a turbo pump.

A fourth aspect of the present disclosure is that in the sealing device of the third aspect, an oxidizer impeller causing an oxidizer to flow, a fuel impeller causing fuel to flow, and a turbine generating rotational power by drive gas flowing in from outside are attached to the rotary shaft.

An integrated pump of a fifth aspect of the present disclosure includes: a rotary shaft; an oxidizer impeller or a fuel impeller, and a turbine, attached to the rotary shaft; and the sealing device according to any one of the first to fourth aspects, and the rotary shaft serves as the sealed shaft of the sealing device.

Effects

According to the present disclosure, it is possible to provide a sealing device and an integrated pump having higher reliability than that of the related art.

DESCRIPTION OF EMBODIMENTS

Hereinafter, an embodiment of the present disclosure is described with reference to the drawings.

Figure 1:
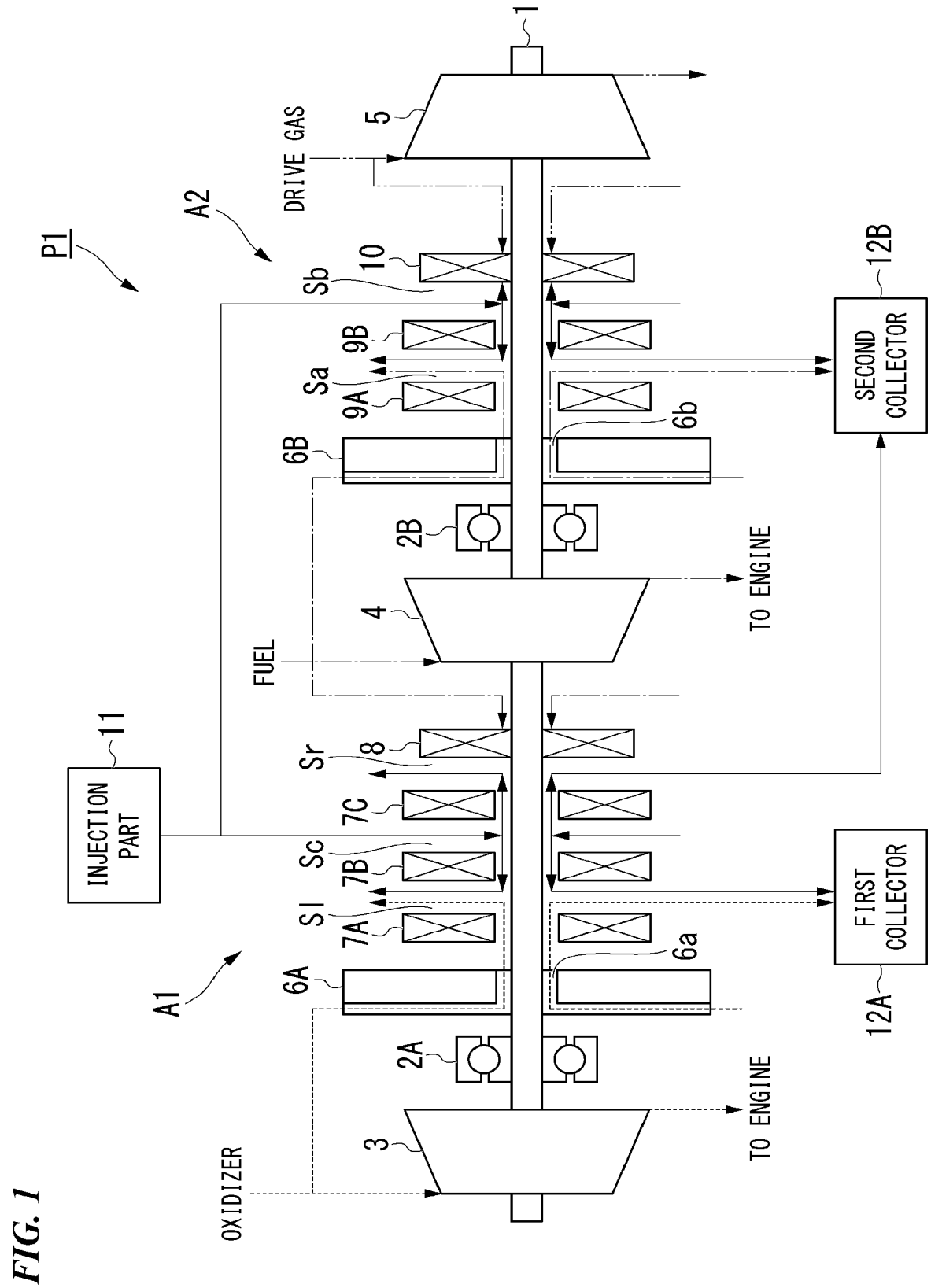
FIG. 1 is a schematic diagram showing configurations of a sealing device and an integrated pump of an embodiment of the present disclosure.

As shown in FIG. 1, an integrated pump P1 of this embodiment is a turbo pump (centrifugal pump; non-positive displacement pump) that supplies oxidizer and fuel to a rocket engine. The oxidizer is, for example, liquid oxygen, and the fuel is, for example, LNG (Liquefied Natural Gas).

As shown in FIG. 1, the integrated pump P1 includes a rotary shaft 1 (sealed shaft), first and second bearings 2A and 2B, a first impeller 3, a second impeller 4, a turbine 5, first and second walls 6A and 6B, first to third non-contact seals 7A to 7C, a first contact seal 8, fourth and fifth non-contact seals 9A and 9B, a second contact seal 10, an injection part 11, and first and second collectors 12A and 12B.

Of these components, the first to third non-contact seals 7A to 7C, the first contact seal 8, the injection part 11, and the first and second collectors 12A and 12B configure a first sealing device A1 of this embodiment. The fourth and fifth non-contact seals 9A and 9B, the second contact seal 10, the injection part 11, and the first and second collectors 12A and 12B configure a second sealing device A2 of this embodiment. The first sealing device A1 and the second sealing device A2 may include the rotary shaft 1 (shaft member). In the following description, a side of the pump on which the first impeller 3 is provided may be referred to as a left side, and a side thereof on which the turbine 5 is provided may be referred to as a right side.

The rotary shaft 1 is a columnar member having a predetermined diameter and a predetermined length and is a sealed shaft in this embodiment. The first and second bearings 2A and 2B are radial bearings rotatably supporting the rotary shaft 1 and are disposed at a predetermined interval in the longitudinal direction (axial direction) of the rotary shaft 1. As shown in FIG. 1, of the first and second bearings 2A and 2B, the first bearing 2A is disposed in the vicinity of the first impeller 3 (i.e., to be adjacent to the right side of the first impeller 3) in the longitudinal direction of the rotary shaft 1, and the second bearing 2B is disposed in the vicinity of the second impeller 4 (i.e., to be adjacent to the right side of the second impeller 4) in the longitudinal direction of the rotary shaft 1.

FIG. 1 shows only the first and second bearings 2A and 2B (radial bearings) as support members rotatably supporting the rotary shaft 1, but it is a simplified drawing, and thrust bearings may be additionally provided if necessary.

The first impeller 3 is an impeller in which a plurality of blades are provided approximately radially around the central axis and is housed in a casing (first pump casing, not shown). The first impeller 3 is attached to a portion close to the left end (one end) of the rotary shaft 1 to be coaxial with the rotary shaft 1. That is, the first impeller 3 is a rotary blade that rotates around the central axis of the rotary shaft 1 and is an oxidizer impeller that sucks oxidizer in the axial direction and causes it to flow out in the radial direction.

The second impeller 4 is an impeller in which a plurality of blades are provided approximately radially around the central axis and is housed in a casing (second pump casing, not shown). The second impeller 4 is attached to a portion close to the middle of the rotary shaft 1 to be coaxial with the rotary shaft 1 and is a rotary blade that rotates around the central axis of the rotary shaft 1 similarly to the first impeller 3 described above. The second impeller 4 is a fuel impeller that sucks fuel in the axial direction and causes it to flow out in the radial direction.

The turbine 5 (turbine blade) is a vane wheel in which a plurality of blades are provided approximately radially around the central axis and is housed in a casing (turbine casing, not shown). The turbine 5 is attached to a portion close to the right end (the other end) of the rotary shaft 1 to be coaxial with the rotary shaft 1 and is a rotary blade that rotates around the central axis of the rotary shaft 1 similarly to the first impeller 3 and the second impeller 4 described above. The turbine 5 is a motive power source that generates rotational power using drive gas supplied from the outside and rotationally drives the first impeller 3 and the second impeller 4 connected thereto through the rotary shaft 1.

The first wall 6A is part of the first pump casing (not shown) that houses the first impeller 3, that is, is a portion thereof facing the back of the first impeller 3 and is provided with a first through-hole 6a through which the rotary shaft 1 is inserted. The first pump casing is a metal container that houses the first impeller 3 and forms three-dimensional flow paths for the oxidizer. In the first pump casing, as shown by dashed line arrows in FIG. 1, the first through-hole 6a of the first wall 6A forms part of a leakage flow path of the oxidizer.

The second wall 6B is part of the second pump casing (not shown) that houses the second impeller 4, that is, is a portion thereof facing the back of the second impeller 4 and is provided with a second through-hole 6b through which the rotary shaft 1 is inserted. The second pump casing is provided to be adjacent to the first pump casing and is a metal container that houses the second impeller 4 and forms three-dimensional flow paths for the fuel.

Since the rotary shaft 1 penetrates the second impeller 4 and extends to the first pump casing, the second pump casing is also provided with a third through-hole (not shown) at a position facing the left side of the second impeller 4. In the second pump casing, as shown by dashed-dotted line arrows in FIG. 1, the second through-hole 6b of the second wall 6B and the third through-hole (not shown) form parts of a leakage flow path of the fuel.

The above first sealing device A1 is provided between the first impeller 3 and the second impeller 4 as a whole and is a device that prevents or limits contact between the oxidizer discharged by the first impeller 3 and the fuel discharged by the second impeller 4. More precisely, the first sealing device A1 is disposed between the first wall 6A and the second impeller 4.

The first to third non-contact seals 7A to 7C are non-contact type-sealing members arranged at predetermined intervals along the rotary shaft 1. That is, the first to third non-contact seals 7A to 7C limits fluid from flowing along the surface (peripheral surface) of the rotary shaft 1 without the seals contacting the rotary shaft 1. The first to third non-contact seals 7A to 7C do not have to have particularly limited types but are, for example, labyrinth seals or ring seals made of a rubber material.

Of the first to third non-contact seals 7A to 7C, the first non-contact seal 7A is positioned to be next to the right side of the first wall 6A as shown in the drawing and thus is the non-contact type-sealing member closest to the first wall 6A. The second non-contact seal 7B is positioned to be next to the right side of the first non-contact seal 7A and that is, is a non-contact type-sealing member positioned at the center of the first to third non-contact seals 7A to 7C. The third non-contact seal 7C is positioned to be next to the right side of the second non-contact seal 7B and that is, is the non-contact type-sealing member closest to the first contact seal 8.

The first contact seal 8 is a contact type-sealing member provided between the third non-contact seal 7C and the second impeller 4 with a predetermined gap between the first contact seal 8 and the third non-contact seal 7C. That is, the first contact seal 8 is provided on one (right side) of two sides of the first to third non-contact seals 7A to 7C in the axial direction of the rotary shaft 1 and contacts the rotary shaft 1 to limit fluid from flowing along the surface (peripheral surface) of the rotary shaft 1. The first contact seal 8 does not have to have particularly limited types but is, for example, a lip seal, a mechanical seal, or a segment seal having excellent durability in addition to airtightness. The first to third non-contact seals 7A to 7C and the first contact seal 8 are arranged in this order from the left side to the right side of the integrated pump P1.

Since the first to third non-contact seals 7A to 7C and the first contact seal 8 are arranged at predetermined intervals along the rotary shaft 1, they are arranged along the outer peripheral surface of the rotary shaft 1 (in the axial direction), and a plurality of spaces having predetermined widths are provided, and a space of the plurality of spaces is between every two seals. That is, each space is provided between two seals adjacent to each other in the axial direction of the rotary shaft 1. In this embodiment, the space between the second non-contact seal 7B and the third non-contact seal 7C is referred to as a central space Sc, the space between the first non-contact seal 7A and the second non-contact seal 7B is referred to as a first left space Sl, and the space between the third non-contact seal 7C and the first contact seal 8 is referred to as a first right space Sr.

Of the central space Sc, the first left space Sl and the first right space Sr, the central space Sc is a space positioned inside in the arrangement direction of the plurality of spaces formed by the first to third non-contact seals 7A to 7C and the first contact seal 8, that is, is a first space in this embodiment. The first left space Sl and the first right space Sr are second spaces positioned outside in the arrangement direction of the plurality of spaces formed by the first to third non-contact seals 7A to 7C and the first contact seal 8.

That is, purge gas is injected from the injection part 11 into the central space Sc (first space) of the spaces between the first to third non-contact seals 7A to 7C and the first contact seal 8. Of the spaces between the first to third non-contact seals 7A to 7C and the first contact seal 8, the first left space Sl and the first right space Sr (second spaces) are positioned to be next to the central space Sc in the axial direction of the rotary shaft 1.

The above second sealing device A2 is provided between the second impeller 4 and the turbine 5 as a whole and is a device that prevents or limits contact between the fuel discharged by the second impeller 4 and leaked gas of the drive gas flowing into the turbine 5. More precisely, the second sealing device A2 is disposed between the second wall 6B and the turbine 5.

The fourth and fifth non-contact seals 9A and 9B are non-contact type-sealing members arranged at a predetermined interval along the rotary shaft 1. That is, the fourth and fifth non-contact seals 9A and 9B limits fluid from flowing along the surface (peripheral surface) of the rotary shaft 1 without the seals contacting the rotary shaft 1. The fourth and fifth non-contact seals 9A and 9B do not have to have particularly limited types but are, for example, labyrinth seals or ring seals made of a rubber material.

Of the fourth and fifth non-contact seals 9A and 9B, the fourth non-contact seal 9A is positioned to be next to the right side of the second wall 6B as shown in FIG. 1 and thus is the non-contact type-sealing member closest to the second wall 6B. The fifth non-contact seal 9B is positioned to be next to the right side of the fourth non-contact seal 9A and that is, is the non-contact type-sealing member closest to the second contact seal 10.

The second contact seal 10 is a contact type-sealing member provided between the fifth non-contact seal 9B and the turbine 5 with a predetermined gap between the second contact seal 10 and the fifth non-contact seal 9B. That is, the second contact seal 10 contacts the rotary shaft 1 to limit fluid from flowing along the surface (peripheral surface) of the rotary shaft 1. The second contact seal 10 does not have to have particularly limited types but is, for example, a lip seal, a mechanical seal, or a segment seal having excellent durability in addition to airtightness. The fourth and fifth non-contact seals 9A and 9B and the second contact seal 10 are arranged in this order from the left side to the right side of the integrated pump P1.

Since the fourth and fifth non-contact seals 9A and 9B and the second contact seal 10 are arranged at predetermined intervals along the rotary shaft 1, they are arranged in the axial direction of the rotary shaft 1, and a plurality of spaces having predetermined widths are provided, and a space of the plurality of spaces is between every two seals. That is, each space is provided between two seals adjacent to each other in the axial direction of the rotary shaft 1. In this embodiment, the space between the fourth non-contact seal 9A and the fifth non-contact seal 9B is referred to as a second left space Sa, and the space between the fifth non-contact seal 9B and the second contact seal 10 is referred to as a second right space Sb.

The injection part 11 is a gas injection part that supplies purge gas into the central space Sc and the second right space Sb. That is, the injection part 11 supplies purge gas having a relatively high pressure into the central space Sc and the second right space Sb. The purge gas is gas (inert gas) that is inert to the oxidizer, the fuel and the drive gas and is, for example, nitrogen gas or helium gas.

Of the first and second collectors 12A and 12B, the first collector 12A is a collector that collects fluid from the first left space Sl. The first collector 12A collects some fluids of various fluids, i.e., the purge gas that has passed through the second non-contact seal 7B and the oxidizer that has leaked from the first wall 6A. On the other hand, the second collector 12B is a collector that collects fluid from the first right space Sr and the second left space Sa. The second collector 12B collects the purge gas that has passed through the third non-contact seal 7C and the fifth non-contact seal 9B and the fuel that has leaked from the second wall 6B of the various fluids. That is, in this embodiment, at least the oxidizer and the fuel are separately collected.

Next, the operation of the integrated pump P1 and the operation and effect of the sealing devices A1 and A2 of this embodiment are described in detail.

In the integrated pump P1 of this embodiment, the rotational power around the turbine 5 is generated by the drive gas being supplied to the turbine 5, and the rotary shaft 1, the first impeller 3 and the second impeller 4 rotate by the generated rotational power. Then, the oxidizer having a flow rate according to the rotation speed of the first impeller 3 is supplied to a thrust chamber assembly of an engine (not shown), and the fuel having a flow rate according to the rotation speed of the second impeller 4 is also supplied to the thrust chamber assembly. The engine then generates thrust according to the flow rates of the oxidizer and the fuel.

In the operation of the integrated pump P1 in this way, the sealing devices A1 and A2 of this embodiment operate as follows. The injection part 11 constantly supplies purge gas into the central space Sc of the first sealing device A1 and the right space Sb of the second sealing device A2 during the operation of the integrated pump P1.

In the first sealing device A1, the fluid flow (leakage) along the surface (peripheral surface) of the rotary shaft 1 is almost prevented by the sealing function of the first to third non-contact seals 7A to 7C but it is difficult to completely eliminate the leakage.

With respect to the first to third non-contact seals 7A to 7C, as shown by solid line arrows in FIG. 1, part of the purge gas flows into the left space Sl through a slight gas between the second non-contact seal 7B and the surface (peripheral surface) of the rotary shaft 1 and flows into the right space Sr through a slight gap between the third non-contact seal 7C and the surface (peripheral surface) of the rotary shaft 1.

In the first sealing device A1, as shown by dashed line arrows in FIG. 1, the oxidizer (leaked oxidizer) flows to the surface (peripheral surface) of the rotary shaft 1 through the first wall 6A, and part of the leaked oxidizer flows into the left space Sl through a slight gap between the first non-contact seal 7A of the first sealing device A1 and the surface (peripheral surface) of the rotary shaft 1. Then, the purge gas and the leaked oxidizer that have entered the left space Sl and the purge gas that has entered the right space Sr are continuously collected by the first collector 12A.

In the first sealing device A1, as shown by dashed-dotted line arrows in FIG. 1, part of the fuel (leaked fuel) flows to the first contact seal 8 from the second impeller 4 side (right side) along the surface (peripheral surface) of the rotary shaft 1. This leaked fuel cannot almost pass through the first contact seal 8 because the first contact seal 8 is in contact with the surface (peripheral surface) of the rotary shaft 1.

That is, in the first sealing device A1, in addition to the mechanical sealing function by the first to third non-contact seals 7A to 7C and the first contact seal 8, the fluid sealing function by the purge gas from the injection part 11 is obtained, whereby high reliability sealing performance is obtained.

When the supply of the purge gas from the injection part 11 into the central space Sc is stopped due to some trouble, the leaked oxidizer may flow into the central space Sc through a slight gap at the surface (peripheral surface) of the rotary shaft 1. In this case, if a non-contact seal is used instead of the first contact seal 8 as in the related art, the leaked fuel may flow into the central space Sc through a slight gap between the non-contact seal and the surface (peripheral surface) of the rotary shaft 1.

That is, in such a case, the leaked oxidizer and the leaked fuel may come into contact with each other in the central space Sc. However, in the first sealing device A1 of this embodiment, the first contact seal 8 is provided on the right side (the second impeller 4 side) of the right space Sr, from which the leaked fuel flows in, so that entry of the leaked fuel into the right space Sr and further entry thereof into the central space Sc are more reliably limited. Therefore, according to this embodiment, it is possible to provide the sealing device and the integrated pump having higher reliability than that of the related art.

On the other hand, in the second sealing device A2, part of the purge gas flows into the left space Sa through a gap between the fifth non-contact seal 9B and the surface (peripheral surface) of the rotary shaft 1. In the integrated pump P1, as shown by dashed-dotted line arrows in FIG. 1, the fuel (leaked fuel) flows to the surface (peripheral surface) of the rotary shaft 1 through the second wall 6B, and part of the leaked fuel flows into the left space Sa through a gap between the fourth non-contact seal 9A of the second sealing device A2 and the surface (peripheral surface) of the rotary shaft 1. Then, the purge gas and the leaked fuel that have entered the left space Sa are continuously collected by the second collector 12B.

In the integrated pump P1, as shown by dashed double-dotted line arrows in FIG. 1, part of the drive gas (leaked drive gas) flows to the second contact seal 10 from the turbine 5 (right side) along the surface (peripheral surface) of the rotary shaft 1. This leaked drive gas cannot almost pass through the second contact seal 10 because the second contact seal 10 is in contact with the surface (peripheral surface) of the rotary shaft 1.

That is, in the second sealing device A2, in addition to the mechanical sealing function by the fourth and fifth non-contact seals 9A and 9B and the second contact seal 10, the fluid sealing function by the purge gas of the injection part 11 is obtained, whereby high reliability sealing performance is obtained.

When the supply of the purge gas from the injection part 11 into the right space Sb is stopped due to some trouble, the leaked fuel may flow into the right space Sb through a slight gap at the surface (peripheral surface) of the rotary shaft 1. In this case, if a non-contact seal is used instead of the second contact seal 10, the leaked drive gas may flow into the right space Sb through a slight gap between the non-contact seal and the surface (peripheral surface) of the rotary shaft 1.

However, in the second sealing device A2 of this embodiment, since the second contact seal 10 is provided on the right side (the turbine 5 side) of the right space Sb, from which the leaked drive gas flows in, entry of the leaked drive gas into the right space Sb and further entry thereof into the left space Sa are more reliably limited. Therefore, according to this embodiment, in the second sealing device A2, it is also possible to provide the sealing device and the integrated pump having higher reliability than that of the related art.

The present disclosure is not limited to the above embodiment, and for example, the following modifications are conceivable.

(1) In the above embodiment, as shown in FIG. 1, the integrated pump P1 in which the first impeller 3 and the second impeller 4 are attached to an equal rotary shaft 1 is described, but the present disclosure is not limited to this. For example, as shown in FIG. 2, an integrated pump P2 in which the first impeller 3 and the second impeller 4 are attached to rotary shafts 1A and 1B, respectively, is conceivable.

Figure 2:
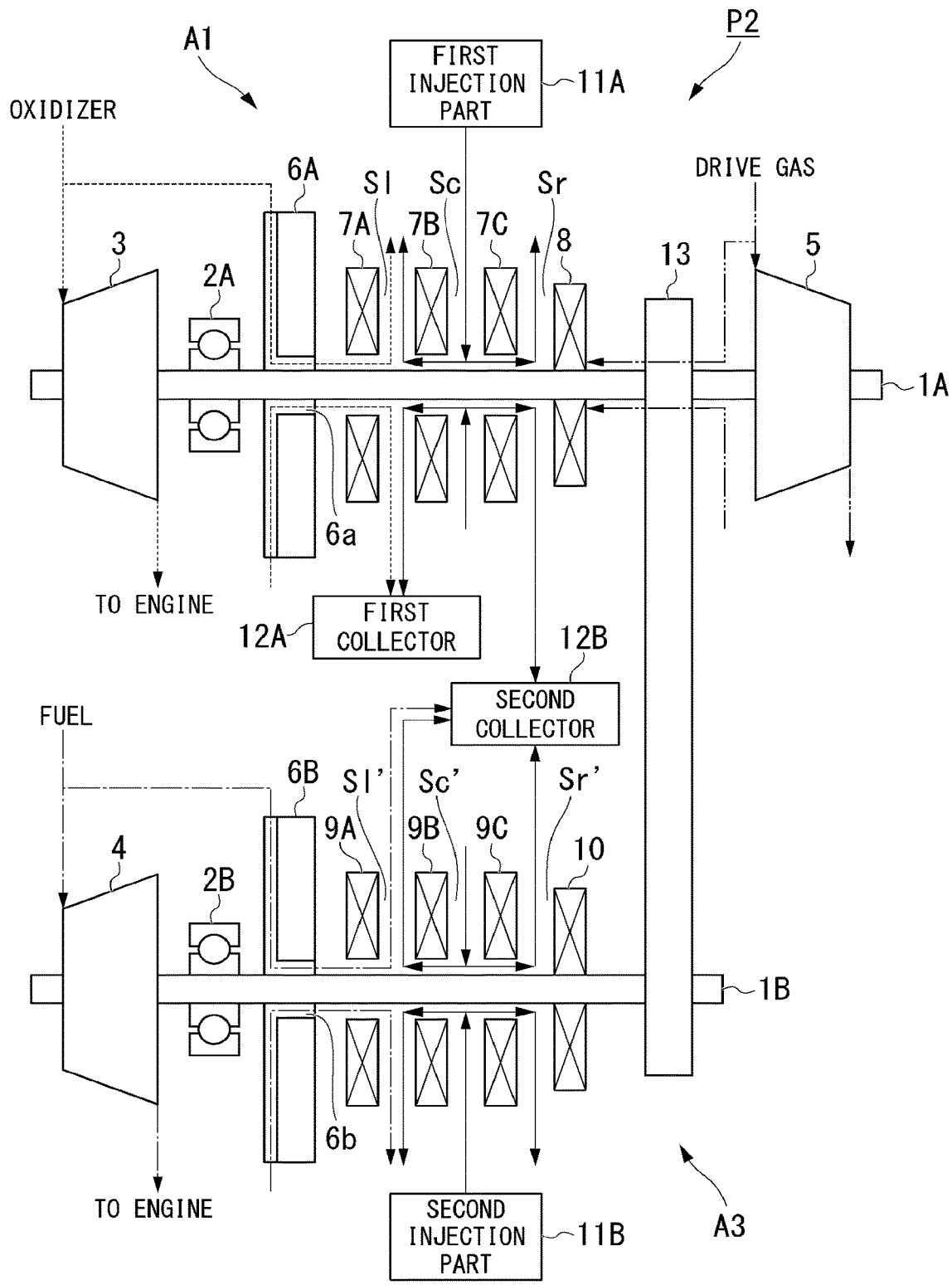
FIG. 2 is a schematic diagram showing configurations of a sealing device and an integrated pump of a modification of the embodiment of the present disclosure.

That is, in the integrated pump P2 shown in FIG. 2, the first impeller 3 and the turbine 5 are attached to the first rotary shaft 1A, the second impeller 4 is attached to the second rotary shaft 1B, and the first rotary shaft 1A and the second rotary shaft 1B are connected through a connecting unit 13. In the integrated pump P2, the first rotary shaft 1A and the first impeller 3 rotate by the rotational power generated by the turbine 5 at the same rotation speed as that of the turbine 5. The second rotary shaft 1B and the second impeller 4 rotate at a rotation speed based on the rotation speed of the turbine 5 and the gear ratio of the connecting unit 13.

In the integrated pump P2, the above-described first sealing device A1 is provided between the first wall 6A and the connecting unit 13 on the first rotary shaft 1A, and a third sealing device A3 having the same configuration as the first sealing device A1 is provided between the second wall 6B and the connecting unit 13 on the second rotary shaft 1B. The third sealing device A3 is a device obtained by adding a sixth non-contact seal 9C between the fifth non-contact seal 9B and the second contact seal 10 in the above-described second sealing device A2. The first sealing device A1 may include the rotary shaft 1A, and the third sealing device A3 may include the rotary shaft 1B.

In the integrated pump P2, sealing gas is supplied individually to the first sealing device A1 and the third sealing device A3. That is, a first injection part 11A supplies purge gas to the first sealing device A1, and a second injection part 11B supplies purge gas to the third sealing device A3.

According to the integrated pump P2 and the sealing devices A1 and A3 of the modification, the contact between the oxidizer and the drive gas is limited by the first sealing device A1, and the contact between the fuel and the drive gas is limited by the third sealing device A3. Even when a trouble occurs such that the purge gas is not supplied to the first sealing device A1 and the third sealing device A3, the passing of the drive gas is blocked by the first contact seal 8 and the second contact seal 10, and thus it is possible to provide the sealing device and the integrated pump having higher reliability than the related art.

In such a modification, the first impeller 3 and the turbine 5 are attached to the first rotary shaft 1A, but instead of this configuration, the second impeller 4 and the turbine 5 may be attached to one rotary shaft.

(2) Each of the first sealing device A1 and the third sealing device A3 of the above embodiment and modification includes three non-contact seals and one contact seal, but the present disclosure is not limited to this. The number of the non-contact seals may be 3 or more, and the number of the contact seals may be 2 or more. That is, a contact seal may be provided on each of two sides of a plurality of non-contact seals in the axial direction of the rotary shaft 1. For example, a non-contact seal or a contact seal may be added to be adjacent to the first contact seal 8 and/or the second contact seal 10, thereby more reliably limiting the passing of fuel and/or drive gas.

(3) In the above embodiment, the turbo pump that supplies oxidizer and fuel to the rocket engine is described, but the present disclosure is not limited to this. The present disclosure can be applied to various devices other than the turbo pump as long as the devices include a rotating machine using two or more fluids.

INDUSTRIAL APPLICABILITY

The present disclosure can be applied to a sealing device that prevents or limits contact between a plurality of types of fluids and to an integrated pump including the sealing device.

The invention claimed is:

1. An integrated pump, comprising:
   a rotary shaft;
   an oxidizer impeller, a fuel impeller and a turbine attached to the rotary shaft in this order in an axial direction of the rotary shaft;
   a first bearing rotatably supporting the rotary shaft between the oxidizer impeller and the fuel impeller;
   a second bearing rotatably supporting the rotary shaft between the fuel impeller and the turbine; and
   a first seal device disposed between the first bearing and the fuel impeller; and
   a second seal device disposed between the second bearing and the turbine, wherein
   each of the first and second seal devices includes:
      a plurality of non-contact seals provided along the rotary shaft;
      a contact seal provided on at least one of two sides of the plurality of non-contact seals;
      an injection part that supplies purge gas into a first space of spaces arranged in the axial direction, the spaces being between the plurality of non-contact seals and the contact seal; and
      a collector that collects the purge gas from a second space of the spaces between the plurality of non-contact seals and the contact seal, the second space being positioned next to the first space in the axial direction,
   the first bearing, the plurality of non-contact seals of the first seal device, and the contact seal of the first seal device are disposed in this order, and
   the second bearing, the plurality of non-contact seals of the second seal device, and the contact seal of the second seal device are disposed in this order.

2. The integrated pump according to claim 1, wherein the collector is configured to collect the purge gas from the second space positioned on each of two sides of the first space.

3. The integrated pump according to claim 1, wherein the integrated pump is a turbo pump.

4. The integrated pump according to claim 1, wherein the contact seal contacts the rotary shaft to limit fluid from flowing along a peripheral surface of the rotary shaft.

5. The integrated pump according to claim 4, wherein the contact seal is a lip seal, a mechanical seal, or a segment seal.

* * * * *